(12) United States Patent
Afshar et al.

(10) Patent No.: US 11,489,819 B2
(45) Date of Patent: Nov. 1, 2022

(54) METHOD AND SYSTEM FOR PRIVATE IDENTITY VERIFICATION

(71) Applicant: Polymath Inc., St. Thomas (BB)

(72) Inventors: Arash Afshar, Calgary (CA); Aram Jivanyan, Yerevan (AM)

(73) Assignee: Polymath Inc., St. Michael (BB)

( * ) Notice: Subject to any disclaimer, the term of this patent is extended or adjusted under 35 U.S.C. 154(b) by 19 days.

(21) Appl. No.: 17/226,663

(22) Filed: Apr. 9, 2021

(65) Prior Publication Data

US 2021/0234840 A1 Jul. 29, 2021

(51) Int. Cl.
*H04L 29/06* (2006.01)
*H04L 9/40* (2022.01)

(52) U.S. Cl.
CPC .............. *H04L 63/0421* (2013.01)

(58) Field of Classification Search
None
See application file for complete search history.

(56) References Cited

U.S. PATENT DOCUMENTS

| | | | | |
|---|---|---|---|---|
| 2005/0289083 | A1* | 12/2005 | Ngai | H04L 9/3247 705/67 |
| 2011/0010720 | A1* | 1/2011 | Smith | G06F 9/54 712/E9.016 |
| 2018/0316653 | A1* | 11/2018 | Kanza | H04L 63/123 |
| 2019/0378119 | A1* | 12/2019 | Hyuga | G06Q 20/0655 |

FOREIGN PATENT DOCUMENTS

WO WO-2016105728 A1 * 6/2016 ............ G06F 21/32
WO WO-2021257664 A1 * 12/2021

OTHER PUBLICATIONS

Dunphy et al., "A First Look at Identity Management Schemes on the Blockchain", IEEE Security & Privacy, vol. 16, Issue: 4, Jul./Aug. 2018.*

(Continued)

*Primary Examiner* — Morshed Mehedi
(74) *Attorney, Agent, or Firm* — Perkins Coie LLP; Colin Fowler (57) ABSTRACT

Methods, systems, and techniques for private identity verification involve obtaining a cryptographically secure commitment that is generated using a first user identifier and a private user identifier associated with the first user identifier; receiving, from an identity verification system, initial zero knowledge proof messages comprising the commitment; sending, to the identity verification system, a set of cryptographically secure known identifier commitments generated using a set of private user identifiers; receiving, from the identity verification system: (i) a zero knowledge proof response generated using the zero knowledge proof challenge; and (ii) proof that the private user identifier used in the initial zero knowledge proof messages comprises part of the set of private user identifiers; and verifying that the private user identifier used in the initial zero knowledge proof messages comprises part of the set of private user identifiers.

20 Claims, 5 Drawing Sheets

(56) References Cited

OTHER PUBLICATIONS

Bangerter, Endre, et al., "Efficient Proofs of Knowledge of Discrete Logarithms and Representations in Groups with Hidden Order", Department of Computer Science, ETH Zurich, CH-8092 Zurich, Switzerland, maurer@inf.ethz.ch, Jan. 2005, 18 pages.
Camenisch, Jan, et al., "Proof Systems for General Statements about Discrete Logarithms", Technical Report No. 260, Dept. of Computer Science, ETH Zurich, ftp://ftp.inf.ethz.ch/pub/publications/tech-reports/, Mar. 1997, 13 pages.
Hao, F., "Schnorr NIZK Proof: Non-interactive Zero Knowledge Proof for Discrete Logarithm", Newcastle University (UK), Internet Engineering Task Force, Jan. 26, 2016, 12 pages.
Jayaraman, Bargav, et al., "Decentralized Certificate Authorities", University of Virginia, https://oblivc.org/dca, Oct. 10, 2017, 12 pages.
Pinkas, Benny, et al., "Phasing: Private Set Intersection using Permutation-based Hashing", 24th Usenix Security Symposium, Washington, D.C., Aug. 12-14, 2015, pp. 515-530.

\* cited by examiner

METHOD AND SYSTEM FOR PRIVATE IDENTITY VERIFICATION

TECHNICAL FIELD

The present disclosure is directed at methods, systems, and techniques for private identity verification; namely, identity verification in which personal information of a user whose identity is being verified is kept private from the entity requesting the verification.

BACKGROUND

In certain situations, it may be desirable to be able to prove the identity of a user without requiring the user to disclose their identity to the party requesting the verification. For example, in the medical context, a patient may wish to verify whether they are on a list of persons who have a particular disease without disclosing their name. While conventional techniques exist to enable this functionality, they tend to have high bandwidth requirements between different computer systems and be computationally intensive, thereby taking a relatively long time for those computer systems to perform.

SUMMARY

According to a first aspect, there is provided a method comprising: obtaining a cryptographically secure commitment that is generated using a first user identifier and a private user identifier associated with the first user identifier; receiving, from an identity verification system, initial zero knowledge proof messages comprising the commitment; sending, to the identity verification system, a set of cryptographically secure private user identifier commitments generated using a set of private user identifiers; receiving, from the identity verification system: a zero knowledge proof response generated using the zero knowledge proof challenge; and proof that the private user identifier used in the initial zero knowledge proof messages comprises part of the set of private user identifiers; and verifying that the private user identifier used in the initial zero knowledge proof messages comprises part of the set of private user identifiers.

The method may further comprise sending the zero knowledge proof challenge for the commitment to the identity verification system before receiving the zero knowledge proof response.

The first user identifier may comprise a wallet address of a user stored on a blockchain.

Obtaining the commitment may comprise retrieving the commitment from the blockchain.

The method may further comprise: obtaining a security parameter specifying a size of the set of private user identifiers; padding the set of private user identifiers such that the set of private user identifiers has a size of the security parameter; shuffling the padded set of private user identifiers; and generating the set of private user identifier commitments from the shuffled and padded set of the private user identifiers.

The commitment may be generated using a hash of the first user identifier and the private user identifier concatenated together.

The commitment may comprise $g^{UID}h^{pUID}f^{hash(UID,pUID)}$ and the initial zero knowledge proof messages may comprise the commitment, $C_a$, $C_b$, $C_d$, A, B, and D, wherein UID is the first user identifier, pUID is the private user identifier, hash(UID,pUID) is the hash of the first user identifier and the private user identifier concatenated together, each of g, h, and f is a proper group generator orthogonal to each other, $C_a$=commitment$^r$, $C_b=(g^{UID})^r(f^{hash(UID,pUID)})^r$, $C_d=(h^{pUID})^r$, A=commitment$^{ra}$, B=$g^{rb0}f^{rb1}$, D=$h^{rd}$, g, h, h, and f, commitment is the commitment, and each of r, ra, rb0, rb1, and rd is a random number. The zero knowledge proof response may comprise $R_a$, $R_{b0}$, $R_{b1}$, and $R_d$, wherein $R_a$=ra+challenge*r, $R_{b0}$=rb0+challenge*r*UID, $R_{b1}$=rb1+challenge*r*hash(pUID, UID), $R_d$=rd+challenge*r*pUID, and challenge is the zero knowledge proof challenge.

The set of private user identifiers may be pUIDSet and pUIDSet={$pUID_1$, $pUID_2$, ... $pUID_m$}, wherein each element of the set of cryptographically secure private identifier commitments is Committed $pUID_i$ wherein Committed $pUID_i$ is $h^{pUID_i*R}$, i is an index for pUIDSet, and R is a random value, and wherein the proof that the private user identifier used in the initial zero knowledge proof messages comprises part of the set of private user identifiers comprises a set of recommitted pUIDs, wherein each element of the set of recommitted pUIDs is Recommitted $pUID_i$ and is (Committed $pUID_i)^r$.

Verifying that the private user identifier used in the initial zero knowledge proof messages comprises part of the set of private user identifiers may comprise determining $(C_d/C_b)^R$ comprises part of the set of recommitted pUIDs.

According to another aspect, there is provided a system comprising: a processor; a network interface communicatively coupled to the processor; and non-volatile storage communicatively coupled to the processor and having stored thereon computer program code that is executable by the processor and that, when executed by the processor, causes the processor to perform a method according to any of the foregoing aspects and suitable combinations thereof.

According to another aspect, there is provided a non-transitory computer readable medium having stored thereon computer program code that is executable by a processor and that, when executed by the processor, causes the processor to perform a method according to any of the foregoing aspects and suitable combinations thereof.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

In certain situations, a user may want or need to verify their identity to a service provider without disclosing their personal information. For example, the service provider may control access to a meeting and have a list of people permitted to enter the meeting, and individual attendees may need to verify that they are on the list to gain admittance while at the same time not wanting to disclose their name to the service provider. As another example, the service provider may be selling a certain type of product, such as alcohol or marijuana, and may only be permitted to sell that product to particular individuals. A purchaser may need to prove to the service provider that they are on a list of permitted buyers, but may not wish to disclose their identity to the service provider.

The methods and systems of at least some embodiments herein permit multiple computer systems to solve the problem of how to prove the identity of a user to a service provider, without requiring the user to disclose personal information to the service provider, in a computationally efficient manner. Computational efficiency may be measured by the bandwidth required between the different systems used by the user, the service provider, and/or an identity verifier that performs identity verification on behalf of the service provider, and also by the speed taken to perform the identity verification. More generally, the identity verifier on behalf of the service provider stores a target set comprising one or more set members (e.g., each set member may represent an individual entitled to enter a meeting), and the identity verifier on behalf of the user makes a public (i.e., visible to the service provider) and cryptographically secure commitment that the user owns a secret member of that set (e.g., that the user is one of the individuals entitled to enter the meeting). As described further below, this permits the service provider to conclude that the public commitment is valid and well formed and that the public commitment corresponds to an element of the target set, without the user's secret member being disclosed to the service provider and without revealing the service provider's private set to the user.

Figure 1:
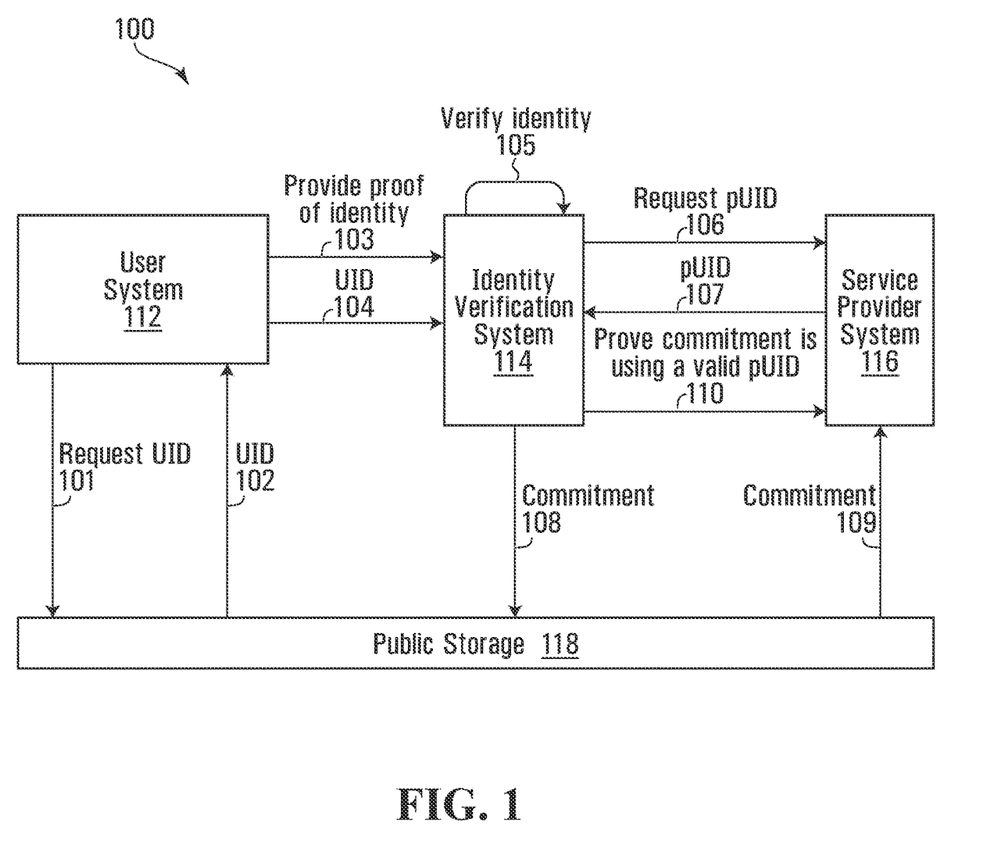
FIG. 1 depicts a system depicting data exchanged during implementation of an example protocol for private identity verification between a user system, an identity verification system, a service provider system, and public storage.

FIG. 1 depicts a system 100 depicting data exchanged during implementation of an example protocol for private identity verification between a user system 112, an identity verification system 114 ("ID verification system 114"), a service provider system 116, and public storage 118. The user system 112 is a computer system used by an individual user who intends to receive a service requiring identity verification from a service provider and whose identity accordingly is to be verified. While the user system 112 is depicted as a computer system in FIG. 1, in at least some other embodiments (not depicted) an individual user may directly interface with the ID verification system 114. The service provider system 116 executes software that offers a service to the user and that desires to verify the user's identity before offering that service. The ID verification system 114 verifies the identity of the user on behalf of the server provider system 116 without sharing personally identifiable information of the user with the service provider system 116. An example ID verification system 114 is a system operated by a customer due diligence (CDD) provider.

Figure 5:
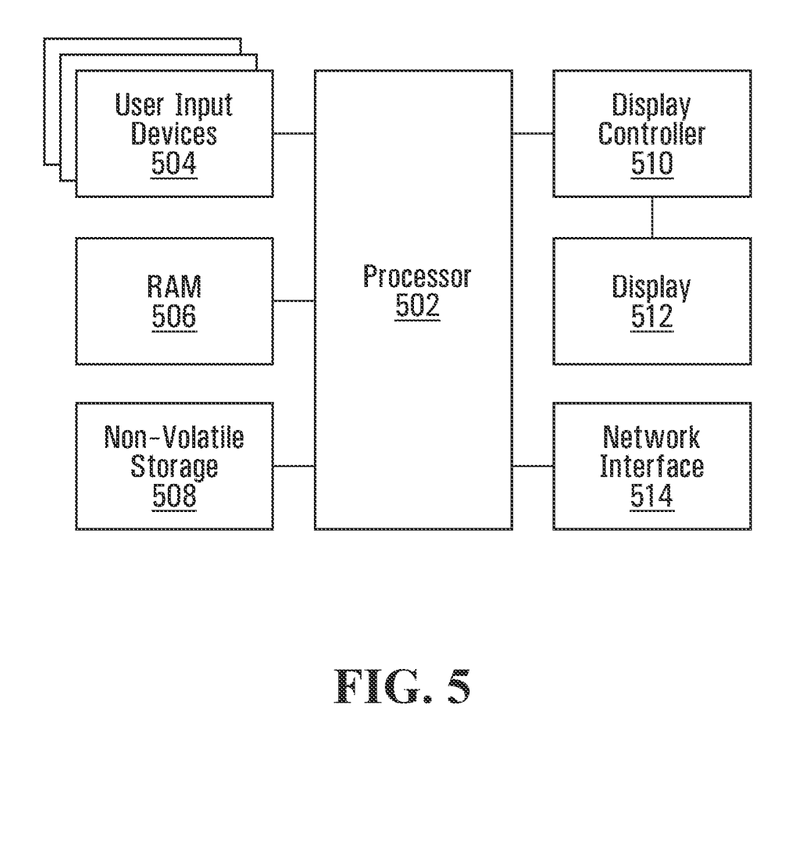
FIG. 5 depicts an example computer system that may be used as one or more of the user system, identity verification system, and service provider system of FIG. 1.

Referring now to FIG. 5, an example computer system is shown of which three different instances may respectively serve as the user system 112, ID verification system 114, and service provider system 116. In FIG. 5, the computer system comprises a processor 502 that controls the computer system's overall operation. The processor 502 is communicatively coupled to and controls subsystems comprising user input devices 504 (e.g., any one or more of a keyboard, mouse, touch screen, and voice control); random access memory ("RAM") 506, which stores computer program code for execution at runtime by the processor 502; non-volatile storage 508 (e.g., a solid state drive), which is an example of a non-transitory computer readable medium, stores the computer program code executed by the RAM 506 at runtime and other data, such as user identifiers and data required for secure cryptographic exchanges as discussed further below; a display controller 510, which is communicatively coupled to and controls a display 512; and a network interface 514, which facilitates network communications between the systems 112, 114, 116, and/or public storage 118. The computer program code stored on the non-volatile storage 508 is configured to cause the processor 502 to execute the various methods described herein.

The ID verification system 114 and service provider system 116 may be controlled by separate organizations, or they may be controlled by different departments of the same organization that do not share users' personally identifiable information with each other. For example, the service provider system 116 may execute software that allows users to purchase stocks. One department of an organization may operate the service provider system 116, while another department of the organization may operate the ID verification system 114, with the two departments and systems 114, 116 maintaining a barrier across which users' personally identifiable information is not shared. Users may then first interact with the ID verification system 114 to ensure that they satisfy certain characteristics (e.g., citizenship, age, residency, etc.), and only following this verification be allowed to make purchases using the service provider system 116. In this way, the service provider system 116 only knows that the users making purchases are qualified to do so, without having knowledge of the users' personally identifiable information.

The public storage 118 may be any suitable form of public storage, such as a public or private cloud or other database. In some embodiments, the public storage 118 may comprise a blockchain, and data retrieved from and written to the public storage 118 is respectively read from and written to the blockchain.

Data exchanged between the various systems 112, 114, 116 during performance of an example protocol for private identity verification is depicted in FIG. 1 as resulting from actions 101-110. The user system 112 obtains a first user identifier in the form of a random and unique user identifier (UID) from the public storage 118; the user system 112 requests the UID from the public storage 118 as action 101, and the UID is sent from the public storage 118 to the user system 112 at action 102. When the public storage 118 comprises a blockchain, a user's wallet address used to store cryptocurrency for that user may act as the UID for the user. The user system 112 provides proof of the user's identity to the ID verification system 114 (action 103) and also sends to the ID verification system 114 the UID obtained from the public storage 118 (action 104). The proof of identity may be, for example, a type of photo identification such as a passport or driver's license. The ID verification system 114 verifies the user's identity (action 105); this may be done by querying a third party system such as a governmental database using information from the proof of identity, or through standalone inspection of the proof of identity (e.g., an automated analysis of the photo identification).

Following the ID verification system 114 verifying the user's identity at action 105, the ID verification system 114 contacts the service provider system 116 at action 106 and obtains a new private unique random identifier (pUID) at action 107. The UID and pUID are generated independently, and consequently both the service provider system 114 and user system 112 are unaware of the linkage formed by the ID verification system 114 between the UID and pUID. The ID verification system 114 nonetheless internally associates the pUID and the UID with each other.

At action 108, the identity verification provider commits a cryptographically secure combination of the pUID and UID to the public storage 118; this commitment is "cryptographically secure" in that it is generated by applying a one-way function such that neither the pUID nor the UID can be practically determined from the commitment alone. After the ID verification system 114 stores the commitment on the public storage 118, the service provider system 116 obtains the commitment by retrieving it from the public storage at action 109. Following action 109, both the ID verification system 114 and the service provider system 109 have the public commitment, and as described further below the ID verification system 114 generates and sends a proof to the service provider system 116 that the UID has been verified without leaking the pUID (action 110), and the service provider system 116 verifies the proof that permits it to trust the UID without having access to personally identifiable information linking the UID to the user or user system 112.

Figure 2:
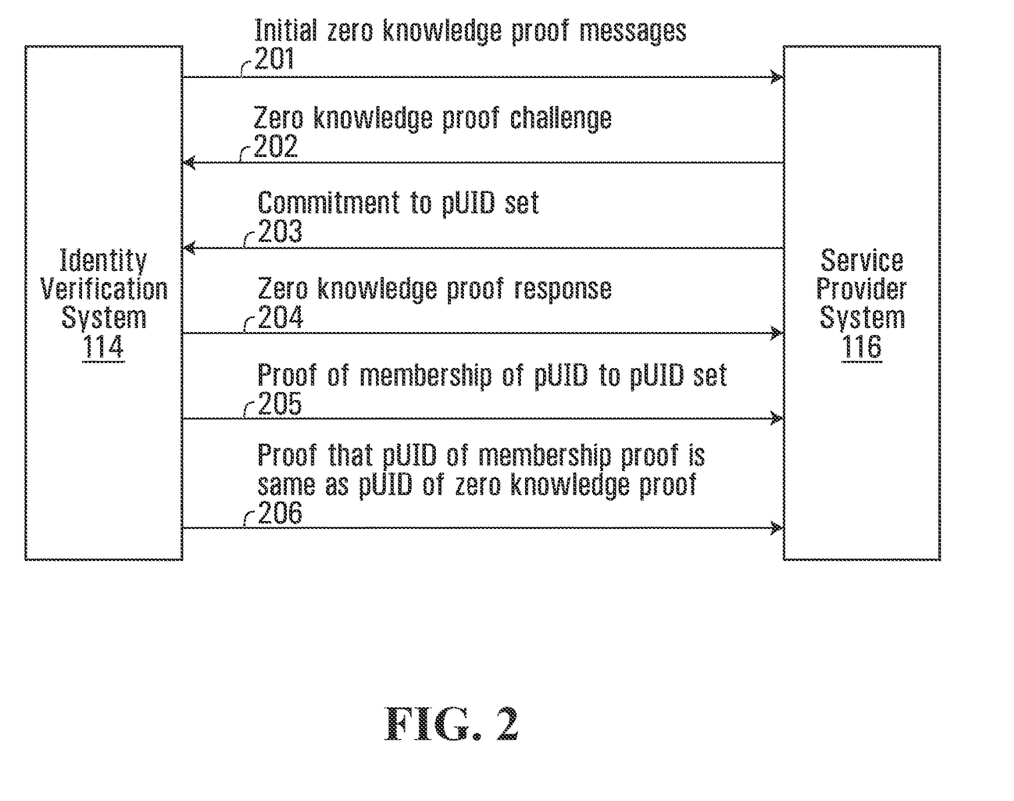
FIG. 2 depicts the identity verification system and service provider system of FIG. 1, and the data exchanged between them during implementation of the example protocol of FIG. 1 when the identity verification system is proving to the service provider system that a public commitment uses a valid private user ID.

Referring now to FIG. 2, the identity verification and service provider systems 114, 116 and the data exchanges between them when performing action 110 are depicted. Performing action 110 involves the ID verification system 114 sending a proof to the service provider system 116 that the UID has been verified without leaking the pUID. This comprises proving that the commitment is using a valid pUID. The ID verification system 114 first generates initial messages for a zero knowledge proof about the public commitment stored on the public storage 118 via action 108 and sends those initial zero knowledge proof messages to the service provider system 114 (action 201). The service provider system 116 responds with a challenge for the zero knowledge proof (action 202), commits to all of the pUIDs it has generated, and shuffles them. The service provider system 116 sends the shuffled list of pUIDs to the ID verification system 114, representing a commitment to the set of all pUIDs (action 203). As with the ID verification system's 114 public commitment, the service provider system's 116 commitment to the pUIDs is cryptographically secure in that it does not reveal the pUIDs to the ID verification system 114.

At action 204, the ID verification system 114 responds to the zero knowledge proof challenge received by virtue of action 202. At action 205, the ID verification system 114 sends a proof to the service provider system 116 that establishes to the service provider system 116 that the user's pUID is a member of the set of all valid pUIDs represented in the commitment. And at action 206, the ID verification system 114 proves that the pUID shown to be a member of the pUID set in action 205 is the same pUID used in the zero knowledge proof messages of action 201.

Figure 3:
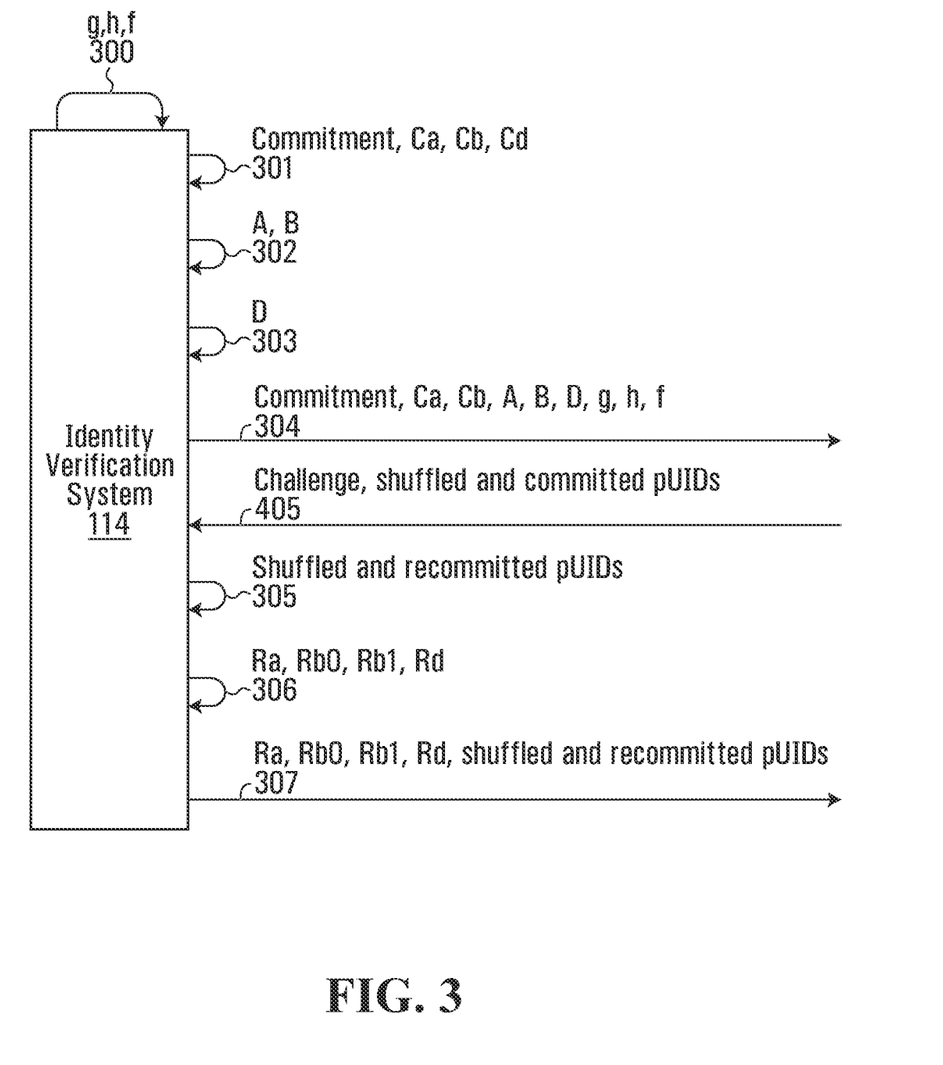
FIG. 3 depicts the identity verification system of FIG. 1, and certain data exchanges involving the identity verification system during implementation of the example protocol of FIG. 1.
Figure 4:
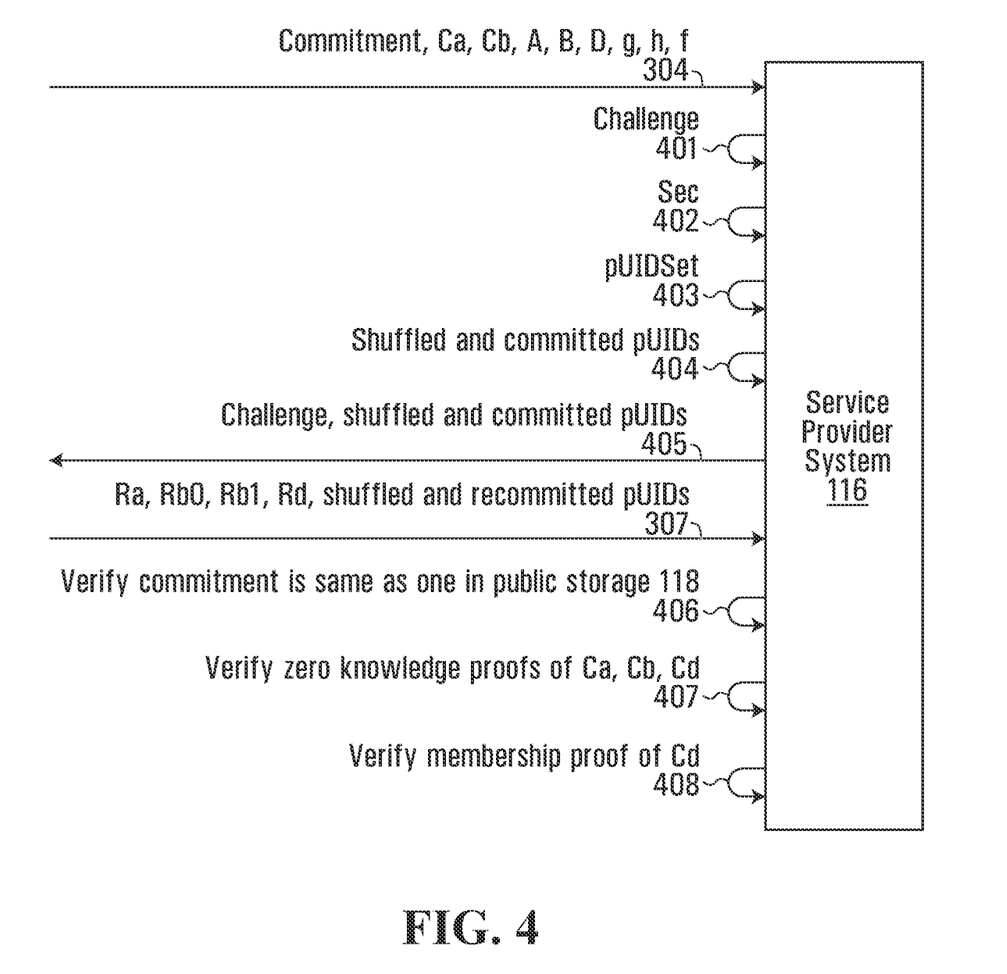
FIG. 4 depicts the service provider system of FIG. 1, and certain data exchanges involving the service provider system during implementation of the example protocol of FIG. 1.

Actions 201 to 206 are described in more detail in respect of FIGS. 3 and 4, below. More particularly, FIGS. 3 and 4 respectively depict the ID verification system 114 in isolation and the service provider system 116 in isolation, with various data exchanges corresponding to the actions of FIG. 2.

To begin, the ID verification system 114 selects g, h, and f (action 300); in this example, each of g, h, and f is a proper group generator and each is orthogonal to the other two generators. More generally, g, h, and f are generated and fixed as global system parameters that are used and referred to unambiguously during performance of the depicted actions by the systems 114, 116. At action 301, the ID verification system 114 then generates the following commitment, together with values $C_a$, $C_b$, and $C_d$, representing zero knowledge proofs:

$$\text{commitment} = g^{UID} h^{pUID} f^{hash(UID,pUID)} \tag{1}$$

$$C_a = \text{commitment}^r \tag{2}$$

$$C_b = (g^{UID})^r (f^{hash(UID,pUID)})^r \tag{3}$$

$$C_d = (h^{pUID})^r \tag{4}$$

where hash(UID,pUID) is a hash of the concatenation of UID and pUID, r is a random value, and the same r is used in Equations (2)-(4). In view of Equations (2)-(4), $C_a = C_b * C_d$.

At action 302, the ID verification system 114 generates two initial messages for the zero knowledge proofs to prove knowledge of $C_a$ and $C_b$:

$$A = \text{commitment}^{ra} \tag{5}$$

$$B = g^{rb0} f^{rb1} \tag{6}$$

for fresh random values ra, rb0, and rb1.

At action 303, the ID verification system 114 generates a proof of the knowledge of the pUID by proving knowledge of $C_d/C_b$:

$$D = h^{rd} \tag{7}$$

for a fresh random rd. As the service provider system 116 is unaware of ra, rb0, and rb1, and rd's value, the proofs are zero knowledge proofs.

At action 304, the ID verification system 114 sends $C_a$, $C_b$, A, B, D, the commitment, g, h, and f to the service provider system 116. $C_d$ in the present embodiment is not sent as it can be determined from $C_a$ and $C_b$. The values $C_a$, $C_b$, A, B, D, the commitment, g, h, and f represent initial zero knowledge proof messages comprising the commitment. This comprises action 201 of FIG. 2.

After the service provider system 116 receives $C_a$, $C_b$, A, B, D, the commitment, g, h, and f from the ID verification system 114, the service provider system 116 at action 401 generates a random value, the zero knowledge proof challenge for the commitment. The service provider system 116 also chooses a security parameter, sec, at action 402; an example value of sec is 100,000. At action 403, the service provider system 116 generates a list of all the pUIDs it has generated, which includes the pUID for the user of the user system 112:

$$\text{pUIDSet} = \{pUID_1, pUID_2, \ldots, pUID_m\} \tag{8}$$

If the size of pUIDSet is less than sec, the service provider system 116 generates dummy/placeholder pUIDs and pads pUIDSet to have at least sec elements. The service provider system 116 makes a cryptographically secure commitment for each of the elements of the pUIDSet, with each of the commitments sharing the same fresh random value R (action 404):

$$\text{Committed pUID}_i = h^{pUID_i * R} \qquad (9)$$

where i is an index for the pUIDSet.

As part of action 404, the service provider system 116 shuffles each pUID in the pUIDSet.

Following the shuffling, the service provider system 116 sends the challenge and the shuffled set of {Committed pUID$_{10}$, Committed pUID$_2$, . . . } (the set of cryptographically secure private user identifier commitments) to the ID verification system 114 (action 405).

After receiving the challenge and the shuffled set of {Committed pUID$_1$, Committed pUID$_2$, . . . } from the service provider system 116, at action 305 the ID verification system 114 recommits to the Committed pUIDs it received using its own random value r used in Equations (1)-(4):

$$\text{Recommitted pUID}_i = (\text{Committed pUID}_i)^r \qquad (10)$$

Also as part of action 305, the ID verification system 114 shuffles the Recommitted pUIDs.

The ID verification system at action 306 generates the zero knowledge response for its initial messages A and B at Equations (5) and (6), which is generated using the zero knowledge proof challenge as follows:

$$R_a = ra + \text{challenge} * r \qquad (11)$$

$$R_{b0} = rb0 + \text{challenge} * r * \text{UID} \qquad (12)$$

$$R_{b1} = rb1 + \text{challenge} * r * \text{hash}(\text{pUID}, \text{UID}) \qquad (13)$$

$$R_d = rd + \text{challenge} * r * \text{pUID} \qquad (14)$$

And at action 307, the ID verification system 114 sends to the service provider system 116 $R_a$, $R_{b0}$, $R_{b1}$, $R_d$, and {Recommitted pUID$_1$, Recommitted pUID$_2$, . . . }. As discussed further below, the set of {Recommitted pUID$_1$, Recommitted pUID$_2$, . . . } is used as proof that the pUID used in the initial zero knowledge proof messages comprises part of the pUIDSet.

After receiving $R_a$, $R_{b0}$, $R_{b1}$, $R_d$, and {Recommitted pUID$_1$, Recommitted pUID$_2$, . . . } from the ID verification system 114, the service provider system 116 verifies that the commitment it received by virtue of action 304 is the same as the commitment on the public storage 118 (action 406).

The service provider system 116 also verifies that the three zero knowledge proofs of $C_a$, $C_b$, and $C_d$ are correct at action 407:

$$\text{commitment}^{R_a} = A * (C_a)^{\text{challenge}} \qquad (15)$$

$$g^{Rb0} * f^{Rb1} = B * (C_b)^{\text{challenge}} \qquad (16)$$

$$h^{R_d} = D * (C_a C_b)^{\text{challenge}} \qquad (17)$$

And at action 408, the service provider system 116 verifies that the pUID used in the initial zero knowledge proof messages sent at action 304 comprises part of the pUIDSet; i.e., that the pUID corresponds to the user and user system 112 comprises part of the set of the service provider system's 116 pUIDs:

$$(C_d / C_b)^R \in \{\text{Recommitted pUIDs}\} \qquad (18)$$

After action 408, the service provider system 116 has confirmed that the public commitment is valid and well formed (by virtue of Equation (15)) and that the public commitment corresponds to an element of the target set (by virtue of Equations (16)-(18)), without the user's secret member being disclosed to the service provider and without revealing the service provider's private set to the user.

In FIG. 2, the service provider system 116 responds with the zero knowledge proof challenge at action 202. The service provider system 116 may generate this challenge randomly, and consequently independently of the ID verification system 114, and send the randomly generated challenge to the ID verification system 114. In at least some other embodiments the ID verification system 114 may obtain the challenge in a way other than explicitly from the service provider system 114. For example, the ID verification system 114 may determine the challenge prior to responding to the zero knowledge proof challenge at action 204. For example, the ID verification system 114 may determine the zero knowledge proof challenge using a deterministic method (e.g., a cryptographic hash function) using one or more of the initial zero knowledge proof messages described in respect of Equations (1)-(7). Upon receiving the initial zero knowledge proof messages from the ID verification system 114 by virtue of action 201, the service provider system 116 may generate the zero knowledge proof challenge itself. In this way, both systems 114, 116 may determine and use the same cryptographically secure challenge without actually communicating the challenge itself between them. In at least some embodiments in which the systems 114, 116 determine the challenge themselves, multiple challenges may be determined and used (e.g., a challenge for each of the commitment, $C_a$, and $C_b$).

Equations (1)-(18) generally describe the system 100 operating in four phases: in the first phase, the ID verification system 114 sends the initial zero knowledge proof messages to the service provider system 116 (Equations (1)-(7)); in the second phase, the service provider system 116 sends the zero knowledge proof challenge and the set of committed pUIDs to the ID verification system 114 (Equations (8) and (9)); in the third phase, the ID verification system 114 responds to the challenge (Equations (10)-(14)); and in the fourth phase, the service provider system 116 verifies the proofs and set membership (Equations (15)-(18)).

Applying a conventional multi-party computational solution to the above described private identity verification problem is markedly less efficient than applying the above-described embodiment. For example, Table 2 of Bargav Jayaraman, Hannah Li, and David Evans, *Decentralized Certificate Authorities*, arXiv:1706.03370v3 [cs.CR] 10 Oct. 2017, describes applying a conventional curve multiplication multi-party computational protocol at a cost of 366 GB in bandwidth. Performing private identity verification as described above would require at least three curve multiplications at a cost of approximately 1 TB of bandwidth for the commitment alone. In contrast, by integrating zero knowledge proofs, the above-described embodiment solves the problem of private identity verification at a bandwidth cost measured in MBs (e.g., approximately 5 MB) instead of TBs. The computational speed is proportionally faster than a conventional multi-party computational protocol as well, as a conventional protocol relies heavily on computationally expensive cryptographic operations such as encryption that are not required in the above-described embodiment.

Example 1

In one example, attendees are attending an event and some of those customers may wish to purchase alcoholic drinks from a bartender. While the event is open to persons of all ages, only those attendees who are at least 21 may purchase alcohol from the bartender. Attendees do not wish to disclose their identities to the bartender; and the bartender also prefers not to be responsible for verifying each attendee's age since doing so incorrectly may expose them to liability.

To solve this problem, attendees verify their age to attendants as they enter the event. Each attendee receives an electronic wristband from an attendant. At the time of obtaining the wristband, each attendant confirms the attendee's identity using the attendee's photo identification and uses a computer system that is an instance of the system of FIG. 5 to obtain a UID from a blockchain on behalf of the user, corresponding to actions 101 to 105 of FIG. 1. If the attendant confirms that the attendee is at least 21, then the attendant also requests a pUID from the bartender's system, which is another instance of the system of FIG. 5. This corresponds to actions 106 and 107 of FIG. 1. The attendant's system in this example acts as the ID verification system 114 and the bartender's system acts as the service provider system 116.

Each wristband has encoded on it an NFC transceiver. Via the wristband's NFC transceiver, the attendant stores the user's UID on the wristband using an NFC transmitter that is connected to their system. At the bar is an NFC reader also connected to the attendee's system. When an attendee wants to order a drink, they scan their wristband using the NFC reader at the bar, which triggers the attendee's system to initiate action 110 of FIG. 1. If the attendee is at least 21, the bartender's system determines that the attendee's pUID is one of the pUIDs the bartender's system allocated when all the attendees were entering the event and indicates that the attendee may be served alcohol. This is done without the bartender's system having knowledge of exactly who the attendee is. If the attendee is under 21, then a pUID was not allocated for the attendee and the bartender's system indicates that the attendee is not to be served, again without having knowledge of exactly who the attendee is.

Example 2

The following is a numerical example that demonstrates the application of Equations (1)-(18) by the ID verification system 114 and the service provider system 116. In this example:
UID=1;
pUID=2;
hash(UID, pUID)=3;
r=4;
ra=5;
rb0=6;
rb1=7;
rd=8;
challenge=9;
pUIDSet={2, 5, 9};
sec=3; and
R=10.

The ID verification system 114 applies Equations (1)-(7), which results in the following:

$$commitment = g^1 h^2 f^3$$

$$C_a = g^4 h^8 f^{12}$$

$$C_b = g^4 f^{12}$$

$$C_d = h^8$$

$$A = g^5 h^{10} f^{15}$$

$$B = g^6 f^7$$

$$D = h^8$$

The service provider system 116 applies Equations (8) and (9). Before shuffling, the service provider system 116 accordingly determines the set of committed pUIDs to be Committed pUIDSet=$\{h^{20}, h^{50}, h^{90}\}$ After shuffling, the service provider system 116 determines the set of shuffled and committed pUIDs to be Shuffled and Committed pUIDSet=$\{h^{90}, h^{50}, h^{20}\}$ The ID verification system 114 applies Equation (10). Before shuffling, the ID verification system 114 accordingly determines the set of recommitted pUIDs to be Recommitted pUIDSet=$\{h^{360}, h^{200}, h^{80}\}$ And after shuffling, the ID verification system 114 determines the set of shuffled and recommitted pUIDs to be Shuffled and Recommitted pUIDSet=$\{h^{200}, h^{360}, h^{80}\}$ The ID verification system 114 applies Equations (11)-(14) to determine the following:

$$R_a = 5 + 9*4 = 41$$

$$R_{b0} = 6 + 9*4*1 = 42$$

$$R_{b1} = 7 + 9*4*3 = 115$$

$$R_d = 8 + 9*4*2 = 80$$

The service provider system 116 verifies the zero knowledge proofs by applying Equations (15)-(18). Equation (15) is evaluated as follows:

$$commitment^{R_a} = A*(C_a)^{challenge}$$

$$g^{41} h^{82} f^{123} = g^5 h^{10} f^{15} \cdot g^{36} h^{72} f^{108}$$

$$g^{41} h^{82} f^{123} = g^{41} h^{82} f^{123}$$

The service provider system 116 evaluates Equation (16) as follows:

$$g^{R_{b0}} * f^{R_{b1}} = B*(C_b)^{challenge}$$

$$g^{42} f^{115} = g^6 f^7 \cdot g^{36} f^{108}$$

$$g^{42} f^{115} = g^{42} f^{115}$$

The service provider system 116 evaluates Equation (17) as follows:

$$h^{R_d} = D*(C_a/C_b)^{challenge}$$

$$h^{80} = h^8 \cdot h^{72}$$

$$h^{80} = h^{80}$$

And the service provider system 116 confirms Equation (18) is true as follows:

$$h^{80} \in \{h^{200}, h^{360}, h^{80}\}$$

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise (e.g., a reference in the claims to "a challenge" or "the challenge" does not exclude embodiments in which multiple challenges are used). It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections. The term "and/or" as used herein in conjunction with a list means any one or more items from that list. For example, "A, B, and/or C" means "any one or more of A, B, and C".

It is contemplated that any part of any aspect or embodiment discussed in this specification can be implemented or combined with any part of any other aspect or embodiment discussed in this specification.

In construing the claims, it is to be understood that the use of computer equipment, such as a processor, to implement the embodiments described herein is essential at least where the presence or use of that computer equipment is positively recited in the claims. It is also to be understood that implementing a blockchain inherently requires computer equipment, such as a processor for creating and authenticating new blocks, storage for storing the blockchain, and a network interface for allowing communication between nodes, which is required for consensus.

One or more example embodiments have been described by way of illustration only. This description is being presented for purposes of illustration and description, but is not intended to be exhaustive or limited to the form disclosed. It will be apparent to persons skilled in the art that a number of variations and modifications can be made without departing from the scope of the claims.

The invention claimed is:

1. A method comprising:
   (a) obtaining a cryptographically secure commitment that is generated using a first user identifier and a private user identifier associated with the first user identifier;
   (b) receiving, from an identity verification system, initial zero knowledge proof messages comprising the commitment;
   (c) sending, to the identity verification system, a set of cryptographically secure private user identifier commitments generated using a set of private user identifiers;
   (d) receiving, from the identity verification system:
      (i) a zero knowledge proof response generated using a zero knowledge proof challenge; and
      (ii) proof that the private user identifier used in the initial zero knowledge proof messages comprises part of the set of private user identifiers; and
   (e) verifying that the private user identifier used in the initial zero knowledge proof messages comprises part of the set of private user identifiers.

2. The method of claim 1, further comprising sending the zero knowledge proof challenge for the commitment to the identity verification system before receiving the zero knowledge proof response.

3. The method of claim 1, wherein the first user identifier comprises a wallet address of a user stored on a blockchain.

4. The method of claim 3, wherein obtaining the commitment comprises retrieving the commitment from the blockchain.

5. The method of claim 1, further comprising:
   (a) obtaining a security parameter specifying a size of the set of private user identifiers;
   (b) padding the set of private user identifiers such that the set of private user identifiers has a size of the security parameter;
   (c) shuffling the padded set of private user identifiers; and
   (d) generating the set of private user identifier commitments from the shuffled and padded set of the private user identifiers.

6. The method of claim 1, wherein the commitment is generated using a hash of the first user identifier and the private user identifier concatenated together.

7. The method of claim 6,
   wherein the commitment comprises $g^{UID}h^{pUID}f^{hash(UID,pUID)}$ and the initial zero knowledge proof messages comprise the commitment, $C_a$, $C_b$, $C_d$, A, B, and D, wherein UID is the first user identifier, pUID is the private user identifier, hash(UID,pUID) is the hash of the first user identifier and the private user identifier concatenated together, each of g, h, and f is a proper group generator orthogonal to each other, $C_a$=commitment$^r$, $C_b$=$(g^{UID})^r(f^{hash(UID,pUID)})^r$, $C_d$=$(h^{pUID})^r$, A=commitment$^{ra}$, B=$g^{rb0}f^{rb1}$, D=$h^{rd}$, g, h, and f, commitment is the commitment, and each of r, ra, rb0, rb1, and rd is a random number, and
   wherein the zero knowledge proof response comprises $R_a$, $R_{b0}$, $R_{b1}$, and $R_d$, wherein $R_a$=ra+challenge*r, $R_{b0}$=rb0+challenge*r*UID, $R_{b1}$=rb1+challenge*r*hash(pUID, UID), $R_d$=rd+challenge*r*pUID, and challenge is the zero knowledge proof challenge.

8. The method of claim 7, wherein the set of private user identifiers is pUIDSet and pUIDSet={pUID$_1$, pUID$_2$, . . . , pUID$_m$}, wherein each element of the set of cryptographically secure private identifier commitments is Committed pUID$_i$ wherein Committed pUID$_{i\text{ is }}$h$^{pUID_i*R}$, i is an index for pUIDSet, and R is a random value, and wherein the proof that the private user identifier used in the initial zero knowledge proof messages comprises part of the set of private user identifiers comprises a set of recommitted pUIDs, wherein each element of the set of recommitted pUIDs is Recommitted pUID$_i$ and is (Committed pUID$_i$)$^r$.

9. The method of claim 8, wherein verifying that the private user identifier used in the initial zero knowledge proof messages comprises part of the set of private user identifiers comprises determining (C$_a$/C$_b$)$^R$ comprises part of the set of recommitted pUIDs.

10. A system comprising:
(a) a processor;
(b) a network interface communicatively coupled to the processor; and
(c) non-volatile storage communicatively coupled to the processor and having stored thereon computer program code that is executable by the processor and that, when executed by the processor, causes the processor to perform a method comprising:
(i) obtaining, via the network interface, a cryptographically secure commitment that is generated using a first user identifier and a private user identifier associated with the first user identifier;
(ii) receiving, via the network interface and from an identity verification system, initial zero knowledge proof messages comprising the commitment;
(iii) sending, via the network interface and to the identity verification system, a set of cryptographically secure private identifier commitments generated using a set of private user identifiers;
(iv) receiving, via the network interface and from the identity verification system:
(A) a zero knowledge proof response generated using the zero knowledge proof challenge; and
(B) proof that the private user identifier used in the initial zero knowledge proof messages comprises part of the set of private user identifiers; and
(v) verifying that the private user identifier used in the initial zero knowledge proof messages comprises part of the set of private user identifiers.

11. The system of claim 10, wherein the method further comprises sending the zero knowledge proof challenge for the commitment to the identity verification system before receiving the zero knowledge proof response.

12. The system of claim 10, wherein the first user identifier comprises a wallet address of a user stored on a blockchain.

13. The system of claim 12, wherein obtaining the commitment comprises retrieving the commitment from the blockchain.

14. The system of claim 10, wherein the method further comprises:
(a) obtaining a security parameter specifying a size of the set of private user identifiers;
(b) padding the set of private user identifiers such that the set of private user identifiers has a size of the security parameter;
(c) shuffling the padded set of private user identifiers; and
(d) generating the set of private user identifier commitments from the shuffled and padded set of the private user identifiers.

15. The system of claim 10, wherein the commitment is generated using a hash of the first user identifier and the private user identifier concatenated together.

16. The system of claim 15,
wherein the commitment comprises g$^{UID}$h$^{pUID}$f$^{hash(UID,pUID)}$ and the initial zero knowledge proof messages comprise the commitment, C$_a$, C$_b$, C$_d$, A, B, and D,
wherein UID is the first user identifier, pUID is the private user identifier, hash(UID,pUID) is the hash of the first user identifier and the private user identifier concatenated together, each of g, h, and f is a proper group generator orthogonal to each other, C$_a$=commitment$^r$, C$_b$=(g$^{UID}$)$^r$(f$^{hash(UID,pUID)}$)$^r$, C$_d$=(h$^{pUID}$)$^r$, A=commitment$^{ra}$, B=g$^{rb0}$f$^{rb1}$, D=h$^{rd}$, g, h, and f, commitment is the commitment, and each of r, ra, rb0, rb1, and rd is a random number, and
wherein the zero knowledge proof response comprises R$_a$, R$_{b0}$, R$_{b1}$, and R$_d$, wherein R$_a$=ra+challenge*r, R$_{b0}$=rb0+challenge*r*UID, R$_{b1}$=rb1+challenge*r*hash(pUID,UID), R$_d$=rd+challenge*r*pUID, and challenge is the zero knowledge proof challenge.

17. The system of claim 16, wherein the set of private user identifiers is pUIDSet and pUIDSet={pUID$_1$, pUID$_2$, . . . , pUID$_m$}, wherein each element of the set of cryptographically secure private identifier commitments is Committed pUID$_i$ wherein Committed pUID$_i$ is h$^{pUID_i*R}$, i is an index for pUIDSet, and R is a random value, and wherein the proof that the private user identifier used in the initial zero knowledge proof messages comprises part of the set of private user identifiers comprises a set of recommitted pUIDs, wherein each element of the set of recommitted pUIDs is Recommitted pUID$_i$ and is (Committed pUID$_i$)$^r$.

18. The system of claim 17, wherein verifying that the private user identifier used in the initial zero knowledge proof messages comprises part of the set of private user identifiers comprises determining (C$_a$/C$_b$)$^R$ comprises part of the set of recommitted pUIDs.

19. A non-transitory computer readable medium having stored thereon computer program code that is executable by a processor and that, when executed by the processor, causes the processor to perform a method comprising:
(a) obtaining a cryptographically secure commitment that is generated using a first user identifier and a private user identifier associated with the first user identifier;
(b) receiving, from an identity verification system, initial messages for the initial zero knowledge proof messages comprising the commitment;
(c) sending, to the identity verification system, a set of cryptographically secure private identifier commitments generated using a set of private user identifiers;
(d) receiving, from the identity verification system:
(i) a zero knowledge proof response generated using the zero knowledge proof challenge; and
(ii) proof that the private user identifier used in the initial zero knowledge proof messages comprises part of the set of private user identifiers; and
(e) verifying that the private user identifier used in the initial zero knowledge proof messages comprises part of the set of private user identifiers.

20. The non-transitory computer readable medium of claim 19, wherein the method further comprises sending the zero knowledge proof challenge for the commitment to the identity verification system before receiving the zero knowledge proof response.

* * * * *